United States Patent
Chen (10) Patent No.: US 9,693,324 B2
(45) Date of Patent: Jun. 27, 2017

(54) METHOD AND DEVICE FOR REPORTING POWER HEADROOM REPORT

(71) Applicant: ZTE CORPORATION, Shenzhen, Guangdong Province (CN)

(72) Inventor: Zhongming Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/111,821

(22) PCT Filed: May 19, 2014

(86) PCT No.: PCT/CN2014/077790
§ 371 (c)(1),
(2) Date: Jul. 15, 2016

(87) PCT Pub. No.: WO2015/106512
PCT Pub. Date: Jul. 23, 2015

(65) Prior Publication Data
US 2016/0337989 A1    Nov. 17, 2016

(30) Foreign Application Priority Data
Jan. 20, 2014    (CN) .......................... 2014 1 0026467

(51) Int. Cl.
*H04B 7/00* (2006.01)
*H04W 52/36* (2009.01)
*H04W 24/10* (2009.01)
*H04W 84/04* (2009.01)

(52) U.S. Cl.
CPC ......... *H04W 52/365* (2013.01); *H04W 24/10* (2013.01); *H04W 84/045* (2013.01)

(58) Field of Classification Search
CPC .......................... H04W 52/365; H04W 84/045
USPC .................................................. 455/444, 522
See application file for complete search history.

(56) References Cited

U.S. PATENT DOCUMENTS

| 2016/0150485 A1* | 5/2016 | Yi | H04W 52/365 370/311 |
| 2016/0198421 A1* | 7/2016 | Yi | H04W 52/365 370/329 |

FOREIGN PATENT DOCUMENTS

| CN | 102300321 A | 12/2011 |
| CN | 102802252 A | 11/2012 |
| WO | WO2012107912 A1 | 8/2012 |

\* cited by examiner

*Primary Examiner* — Tu X Nguyen
(74) *Attorney, Agent, or Firm* — Ling Wu; Stephen Young; Ling and Lang Intellectual Property (57) ABSTRACT

The embodiments of the present document provide a method and device for reporting a power headroom report, which relates to the field of mobile communications, and solves the problem of lacking a triggering and sending mechanism for a PHR of the dual-connectivity terminal in the related art. The method includes: a terminal triggering to report a PHR when detecting that a first cell is added in a SeNB; and the terminal reporting the PHR to a MeNB and/or the SeNB, to which the terminal belongs. The technical scheme provided in the embodiments of the present document is applicable to a long term evolution system, which implements the PHR reporting of the dual-connectivity terminal.

7 Claims, 11 Drawing Sheets

| $C_7$ | $C_6$ | $C_5$ | $C_4$ | $C_3$ | $C_2$ | $C_1$ | R |
|---|---|---|---|---|---|---|---|
| P | V | \multicolumn{6}{l}{PH (Type2, PCell)} |
| R | R | \multicolumn{6}{l}{$P_{CMAX,c}$ 1} |
| P | V | \multicolumn{6}{l}{PH (Type1, PCell)} |
| R | R | \multicolumn{6}{l}{$P_{CMAX,c}$ 2} |
| P | V | \multicolumn{6}{l}{PH (Type2, SCell x)} |
| R | R | \multicolumn{6}{l}{$P_{CMAX,c}$ 3} |
| P | V | \multicolumn{6}{l}{PH (Type2, SCell y)} |
| R | R | \multicolumn{6}{l}{$P_{CMAX,c}$ 4} |
| P | V | \multicolumn{6}{l}{PH (Type2, SCell 1)} |
| R | R | \multicolumn{6}{l}{$P_{CMAX,c}$ 5} |

...

| P | V | PH (Type2, SCell n) |
|---|---|---|
| R | R | $P_{CMAX,c}$ m |

FIG. 3

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type2, PCell)} |
| R | R | \multicolumn{6}{c}{$P_{CMAX,c}$ 1} |
| P | V | \multicolumn{6}{c}{PH (Type1, PCell)} |
| R | R | \multicolumn{6}{c}{$P_{CMAX,c}$ 2} |
| P | V | \multicolumn{6}{c}{PH (Type2, SCell 1)} |
| R | R | \multicolumn{6}{c}{$P_{CMAX,c}$ 3} |
| P | V | \multicolumn{6}{c}{PH (Type1, SCell 1)} |
| R | R | \multicolumn{6}{c}{$P_{CMAX,c}$ 4} |

...

| | | |
|---|---|---|
| P | V | PH (Type2, SCell n) |
| R | R | $P_{CMAX,c}$ m-1 |
| P | V | PH (Type1, SCell n) |
| R | R | $P_{CMAX,c}$ m |

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH(Type2, Cell 1)} | |
| R | R | \multicolumn{6}{c}{$P_{CMAX,c}$ 1} | |
| P | V | \multicolumn{6}{c}{PH(Type1, Cell 1)} | |
| R | R | \multicolumn{6}{c}{$P_{CMAX,c}$ 2} | |
| P | V | \multicolumn{6}{c}{PH(Type2, Cell 4)} | |
| R | R | \multicolumn{6}{c}{$P_{CMAX,c}$ 3} | |
| P | V | \multicolumn{6}{c}{PH(Type1, Cell 3)} | |
| R | R | \multicolumn{6}{c}{$P_{CMAX,c}$ 4} | |
| P | V | \multicolumn{6}{c}{PH(Type1, Cell 4)} | |
| R | R | \multicolumn{6}{c}{$P_{CMAX,c}$ 5} | |

$C_2$ and $C_1$ are 1

| $C_7$ | $C_6$ | $C_5$ | $C_4$ | $C_3$ | $C_2$ | $C_1$ | R |
|---|---|---|---|---|---|---|---|
| P | V | \multicolumn{6}{c|}{PH(Type2, Cell 1)} |
| R | R | \multicolumn{6}{c|}{$P_{CMAX,c}$ 1} |
| P | V | \multicolumn{6}{c|}{PH(Type1, Cell 1)} |
| R | R | \multicolumn{6}{c|}{$P_{CMAX,c}$ 2} |
| P | V | \multicolumn{6}{c|}{PH(Type1, Cell 3)} |
| R | R | \multicolumn{6}{c|}{$P_{CMAX,c}$ 3} |
| P | V | \multicolumn{6}{c|}{PH(Type2, Cell 4)} |
| R | R | \multicolumn{6}{c|}{$P_{CMAX,c}$ 4} |
| P | V | \multicolumn{6}{c|}{PH(Type1, Cell 4)} |
| R | R | \multicolumn{6}{c|}{$P_{CMAX,c}$ 5} |

$C_2$ and $C_1$ are 1

FIG. 12

METHOD AND DEVICE FOR REPORTING POWER HEADROOM REPORT

TECHNICAL FIELD

The present document relates to the field of mobile communications, and particularly, to a method and device for reporting a power headroom report.

BACKGROUND OF THE RELATED ART

Figure 1:
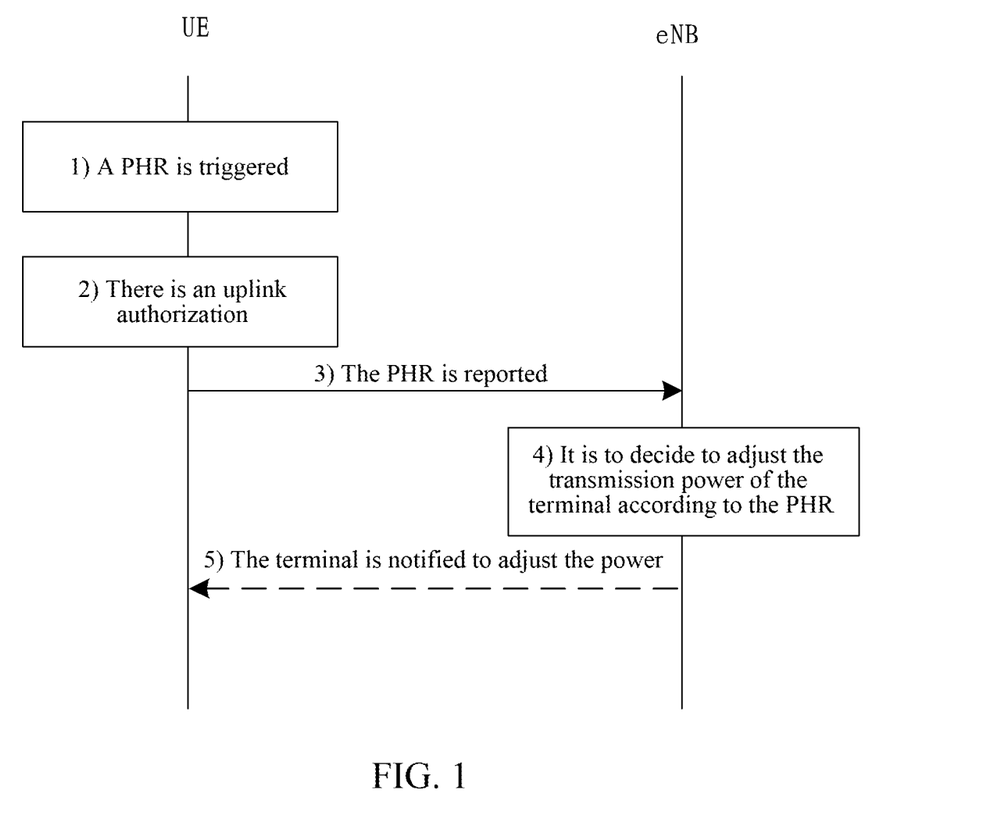
FIG. 1 is a flow chart of a process of triggering and sending a PHR in the related art.

In a Long Term Evolution (LTE) system, the present transmission power of a User Equipment (UE) cannot exceed the maximum transmission power of the UE, generally the UE notifies an eNB of a difference between the maximum transmission power of the UE and the transmission power of the present Uplink Shared Channel (UL-SCH) through a power headroom report (PHR) procedure, and the base station performs uplink scheduling and link adaptation according the difference, and decides whether to perform power control (e.g., to reduce the transmission power or increase the transmission power, and the amount of power required to be adjusted) to satisfy the requirement that the present transmission power of the UE cannot exceed the maximum transmission power of the UE. The PHR procedure is completed by the UE sending an MAC CE of the PHR to the network side. In the related art, there are following cases of triggering the terminal to report the PHR: the path loss change exceeds the specified threshold, a periodic reporting that a timer times out, the configuration of the PHR is changed, a Scell is activated, and the power back-off caused by the power control exceeds a specified threshold. The triggering and sending procedure of the PHR in the related art is as shown in FIG. 1.

Figure 2:
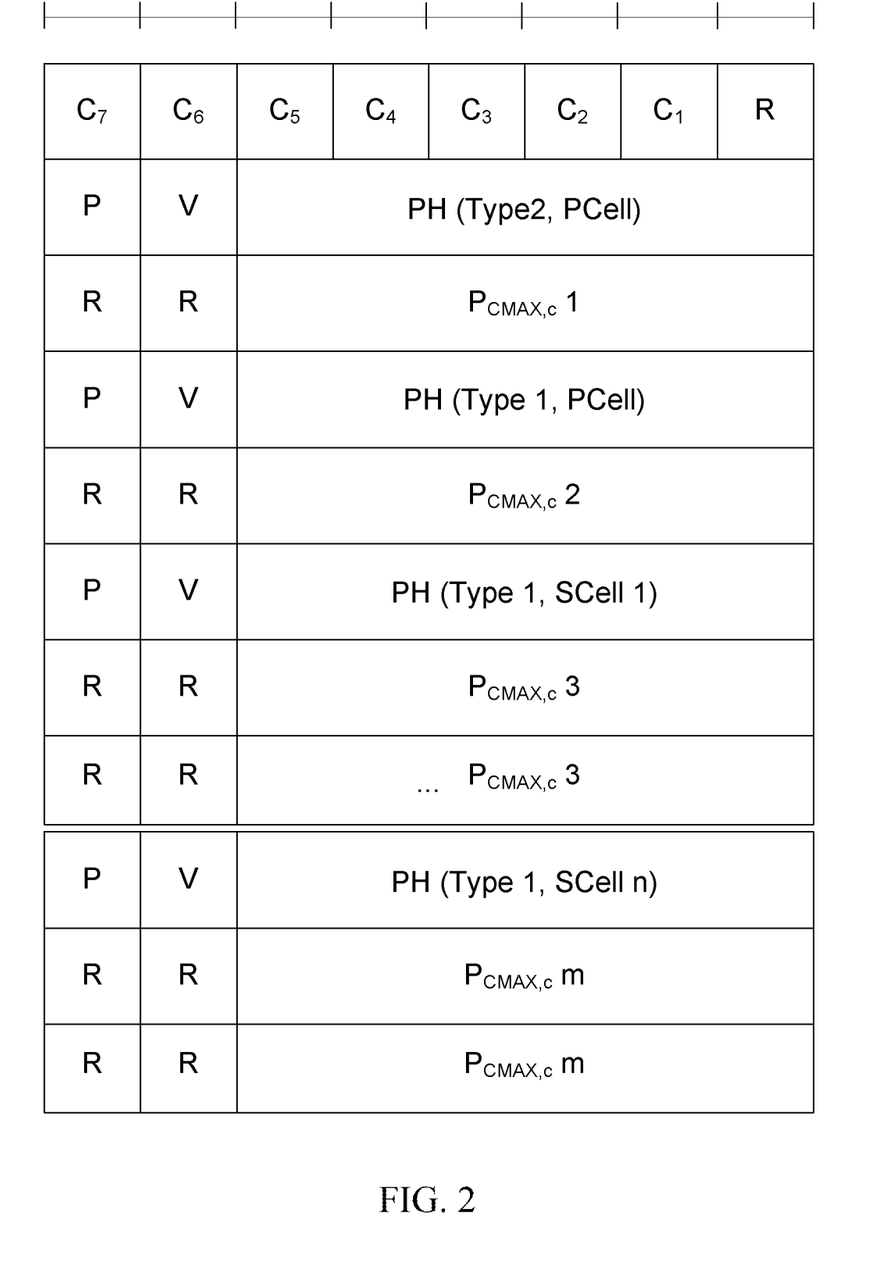
FIG. 2 is a schematic diagram of a reporting format of the PHR in the related art.
Figure 3:
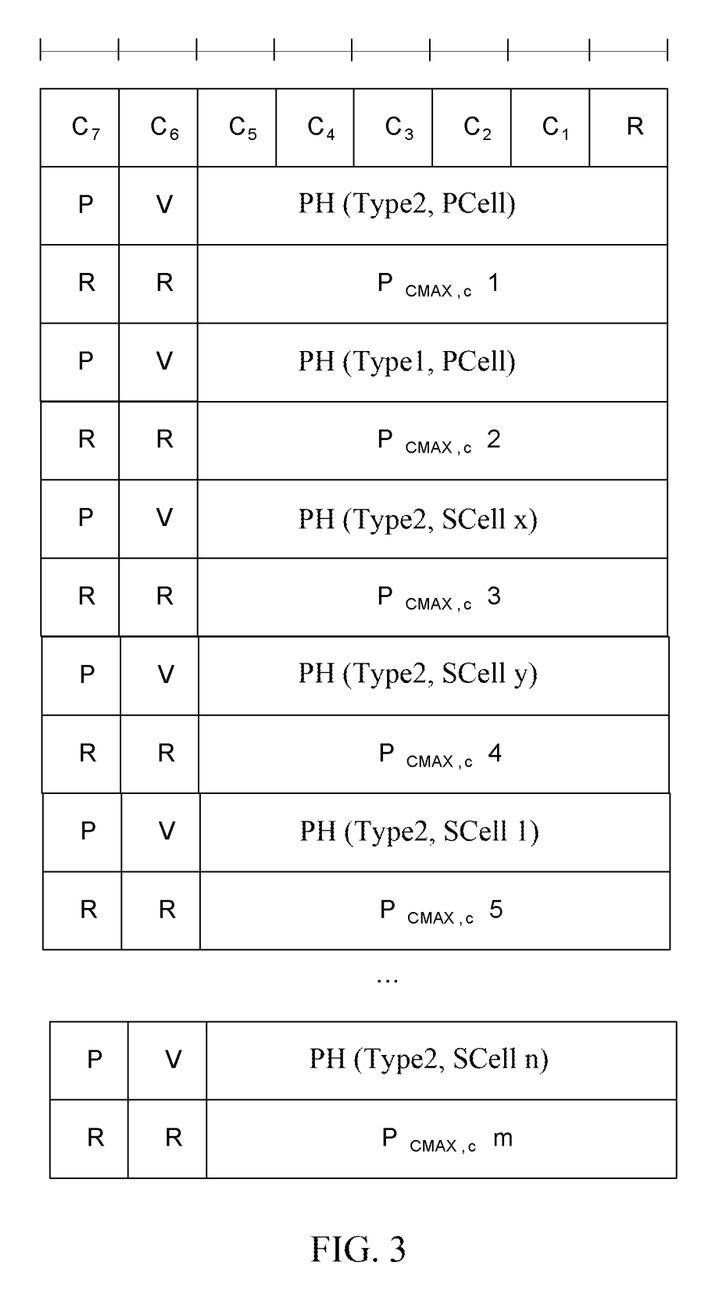
FIG. 3 is a schematic diagram of one reporting format of the PHR used in the embodiment of the present document.
Figure 4:
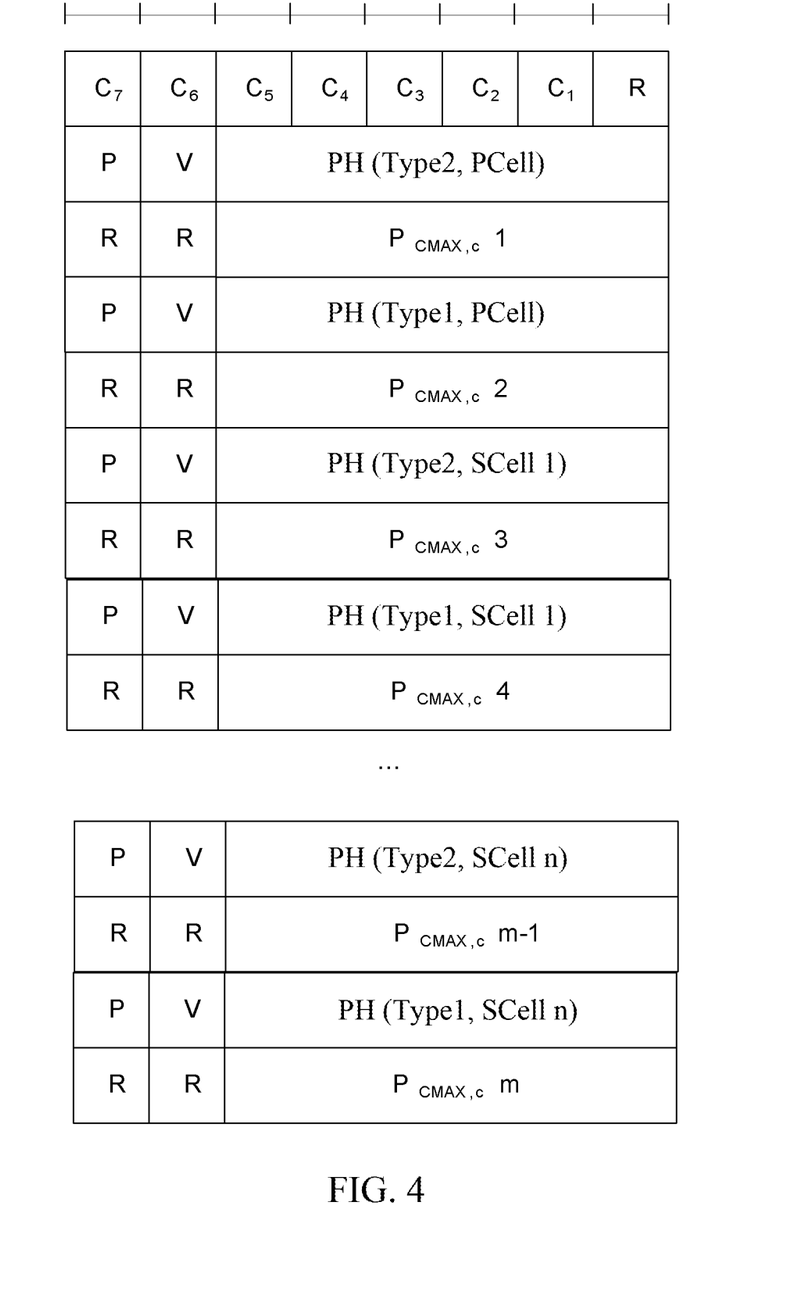
FIG. 4 is a schematic diagram of another reporting format of the PHR used in the embodiment of the present document.

After the Carrier Aggregation (CA) technology is introduced, the UE can communicate with a source base station through a plurality of component carriers (such as a CC1 and a CC2) simultaneously after entering a connected state, and a Primary Cell (Pcell) and a Secondary Cell (Scell) are introduced, and each secondary serving cell is configured with a secondary serving cell identifier. Due to the promotion of the data volume, the number of Scells would increase, for example it can increase to 4, the scenarios would also be expanded, for example an uplink RRH and repeater would be supported. Since a plurality of serving cells are located in the same base station, the protocol architecture of the user plane is not changed, the reporting way of the PHR is only aimed at the introduction of a plurality of serving cells, thus PHRs of all the activated cells require to be reported simultaneously, and since the Pcell may send a Physical Uplink Control Channel (PUCCH) and a Physical Uplink Share Channel (PUSCH) at the same time, a reporting type is added, if the PUCCH and the PUSCH are sent simultaneously, a type 2 is reported, the original is called a type 1, and others are unchanged. The reporting format is as shown in FIG. 2, in the figure, R represents reserved and it is always set as '0', Ci, wherein i is 1 to 7, represents that the PH of a cell corresponding to the secondary serving cell identifier would be reported, for example, if the C1 is '1', it represents that the PH of the secondary serving cell with the secondary serving cell identifier 1 would be reported, and if the C1 is '0', it represents that the PH of the secondary serving cell with the secondary serving cell identifier 1 would not be reported, V represents whether the PH is calculated based on the real transmission or with reference to the format, PH is the reported power headroom, P represents whether the terminal performs power back-off according to the power management, and $P_{CMAX,c}$ represents the $P_{CMAX,c}$ used for calculating the PH. As can be seen from the figure, according to the sequence, a type2 PHR of the Pcell comes first, then comes a type1 PHR of the Pcell, and next comes type1 PHRs of the Scells according to a sequence of the cell identifiers from small to large.

On account of the scarcity of spectrum resources and the sharp increase of mass traffic services of mobile users, the demand for performing hotspot coverage by using a high frequency point such as 3.5 GHz is increasingly apparent, and using low-power nodes becomes a new application scenario, which aims to increase the user throughput and enhance the mobile performance. However, since the signal attenuation of the high frequency point is comparatively severe, the coverage range of the cell is smaller, and the station is not shared with the related cells, thus quite a few companies and operators all tend to seek a new enhanced scheme at present, and Dual Connectivity is one of them. The terminal can keep connections with more than two network nodes simultaneously in the dual connectivity, but the control plane is only connected with one cell therein such as a macro cell, since the difference between wireless environments of different network nodes is relatively great, in order to make the terminal obtain more timely feedback information, one cell of each network node can be configured with the PUCCH, which is used for the terminal performing uplink feedback in the network node. The difference from the carrier aggregation is that the plurality of serving nodes of the terminal are a plurality of base stations, and the time delay between the base stations cannot be ignored. For example, one network node is a macro eNodeB called MeNB, and another network node is a small cell eNodeB called SeNB. Under the background, there has been no disclosed technology with respect to the triggering and sending of the PHR.

SUMMARY

The embodiments of the present document provide a method and device for reporting a power headroom report, which solves the problem of lacking a triggering and sending mechanism for a PHR of the dual-connectivity terminal in the related art.

A method for reporting a power headroom report comprises:

a terminal triggering to report a PHR when detecting that a first cell is added in a SeNB; and the terminal reporting the PHR to a MeNB and/or the SeNB, to which the terminal belongs.

Preferably, the terminal reporting the PHR to a MeNB and/or the SeNB, to which the terminal belongs, comprises:

the terminal configuring a reporting format of a PHR required to be reported according to the following sequence:

a type2 PHR of a primary serving cell;
a type1 PHR of the primary serving cell;
a type2 PHR of a secondary serving cell;
a type1 PHR of the secondary serving cell;

the terminal reporting the PHR to the MeNB and/or the SeNB, to which the terminal belongs, according to the reporting format.

Preferably, when there are a plurality of secondary serving cells that are configured with PUCCH and may perform simultaneously sending of PUCCH and PUSCH, in the reporting format, the type2 PHRs of the plurality of secondary serving cells are arranged according to a sequence of cell identifiers from small to large.

Preferably, when there are a plurality of secondary serving cells in which sending is required, in the reporting format, the type1 PHRs of the plurality of secondary serving cells are arranged according to a sequence of cell identifiers from small to large, preferably, the secondary serving cells include the secondary serving cells that are configured with the PUCCH and may perform simultaneously the sending of the PUCCH and PUSCH.

Preferably, the terminal configuring and reporting the PHR to the MeNB and/or the SeNB, to which the terminal belongs, comprises:

the terminal configuring a reporting format of a PHR required to be reported according to the following sequence:

a type2 PHR of a primary serving cell;

a type1 PHR of the primary serving cell;

a type2 PHR and a type1 PHR of a secondary serving cell, wherein only a secondary serving cell that is configured with PUCCH and may perform simultaneously the sending of PUCCH and PUSCH has the type2 PHR;

the terminal reporting the PHR to a cell and/or a small cell according to the reporting format, to which the terminal belongs.

Preferably, when there are a plurality of secondary serving cells, in the reporting format, the type2 PHRs and the type1 PHRs of the plurality of secondary serving cells are arranged according to a sequence of cell identifiers from small to large.

The embodiment of the present document further provides a device for reporting a power headroom report, which comprises:

a triggering module, configured to trigger to report a PHR when detecting that a first cell is added in a SeNB; and an execution module, configured to report the PHR to a MeNB and/or the SeNB, to which the execution module belongs.

Preferably, the execution module comprises:

a first configuration unit, configured to arrange a reporting format of a PHR required to be reported according to the following sequence:

a type2 PHR of a primary serving cell;

a type1 PHR of the primary serving cell;

a type2 PHR of a secondary serving cell;

a type1 PHR of the secondary serving cell;

a first reporting unit, configured to report the PHR to a cell and/or a small cell, to which the first reporting unit belongs, according to the reporting format.

Preferably, the execution module comprises:

a second configuration unit, configured to arrange a reporting format of the PHR required to be reported according to the following sequence:

a type2 PHR of a primary serving cell;

a type1 PHR of the primary serving cell;

a type2 PHR and a type1 PHR of a secondary serving cell, wherein only a secondary serving cells that is configured with PUCCH and may perform simultaneously the sending of PUCCH and PUSCH has the type2 PHR;

a second reporting unit, configured to report the PHR to a cell and/or a small cell, to which the second reporting unit belongs, according to the reporting format.

The embodiments of the present document provide a method and device for reporting the power headroom, a terminal triggers a PHR when detecting that the first cell is added in a SeNB, configures and reports the PHR to a MeNB and/or the SeNB, to which the terminal belongs. The PHR reporting of the dual-connectivity terminal is implemented, which solves the problem of lacking the triggering and sending mechanism for the PHR of the dual-connectivity terminal in the related art.

PREFERRED EMBODIMENTS

On account of the scarcity of spectrum resources and the sharp increase of mass traffic services of mobile users, the demand for performing hotspot coverage by using a high frequency point such as 3.5 GHz is increasingly apparent, and using low-power nodes becomes a new application scenario, which aims to increase the user throughput and enhance the mobile performance. However, since the signal attenuation of the high frequency point is comparatively severe, the coverage range of the cell is smaller, and the station is not shared with the related cells, thus quite a few companies and operators all tend to seek a new enhanced scheme at present, and Dual Connectivity is one of them. The terminal can keep connections with more than two network nodes simultaneously in the dual connectivity, but the control plane is only connected with one cell therein such as a macro cell, since the difference between wireless environments of different network nodes is relatively great, in order to make the terminal obtain more timely feedback information, one cell of each network node can be configured with the PUCCH, which is used for the terminal performing uplink feedback in the network node. The difference from the carrier aggregation is that the plurality of serving nodes of the terminal are a plurality of base stations, and the time delay between the base stations cannot be ignored. For example, one network node is a macro eNodeB called MeNB, and another network node is a small cell eNodeB called SeNB. Under the background, there has been no disclosed technology with respect to the triggering and sending of the PHR.

In order to solve the above problem, the embodiments of the present document provide a method and device for reporting a power headroom report. The embodiments of the present document will be described in detail in combination with the accompanying drawings below. The embodiments in the present document and the characteristics in the embodiments may be arbitrarily combined with each other in the case of no conflict.

In the following embodiments, the following scenario is used as the application scenario:

a base station 1 is a MeNB, and includes one cell, cell 1;
a base station 2 is a SeNB, and includes two cells, cell 3 and cell 4 respectively.

Firstly the embodiment 1 of the present document will be described in combination with the accompanying drawings.

The embodiment of the present document provides a method for reporting a power headroom report. In the embodiment of the present document, the terminal establishes a connection with the cell 1, the cell 1 is a Pcell, and a PUCCH is configured at the cell 1, and the cell 1 is allowed to simultaneously send the PUCCH and the PUSCH.

Figure 5:
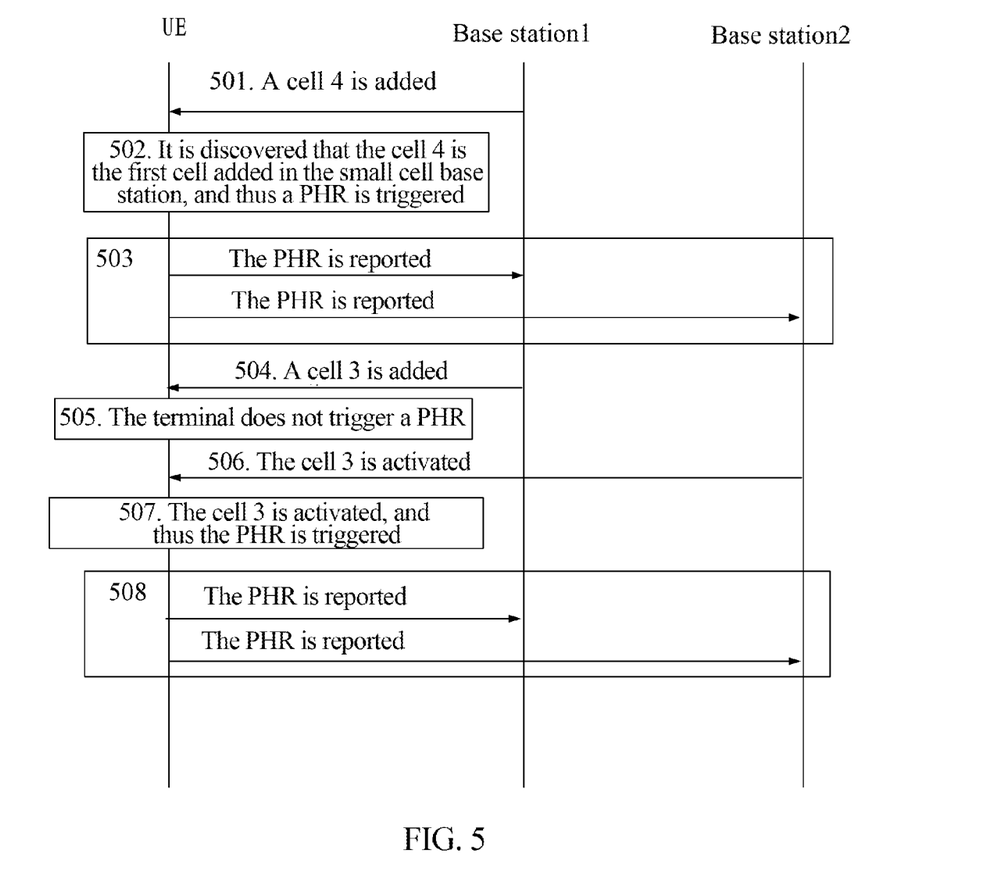
FIG. 5 is a flow chart of a method for reporting a power headroom report provided in the embodiment 1 of the present document.

The procedure for reporting the PHR of the dual-connectivity terminal is completed with the method for reporting the power headroom report provided in the embodiment of the present document, as shown in FIG. 5, and the following steps are included:

In step 501, due to the service traffic increment, the base station 1 adds a cell 4 for the terminal according to a measurement report, the cell 4 is an Scell, whose secondary serving cell identifier is configured as 2, and a PUCCH is configured at the cell 4, and the cell 4 is allowed to simultaneously send the PUCCH and the PUSCH.

In step 502, the terminal receives configuration information of the cell 4, discovers that the cell 4 is the first cell added in the SeNB, and thus triggers a procedure for reporting a PHR.

In step 503, since the PHRs of all cells need to be sent to the base stations including the base station 1 and/or the base station 2, the PHR is sent after receiving an uplink authorization of the cell 1 and cell 4, the terminal discovers that the cell 4 is the secondary serving cell and is allowed to simultaneously send the PUCCH and the PUSCH, a new reporting format requires to be used, and the contents of the reporting format include:

a type2 PHR of the primary serving cell;
a type1 PHR of the primary serving cell;
a type2 PHR of the secondary serving cell;
a type1 PHR of the secondary serving cell;
the terminal reports the PHR to the MeNB and the SeNB, to which the terminal belongs, according to the reporting format.

Preferably, the above secondary serving cells include the secondary serving cells that are configured with the PUCCH and may perform simultaneously the sending of the PUCCH and PUSCH.

Figure 6:
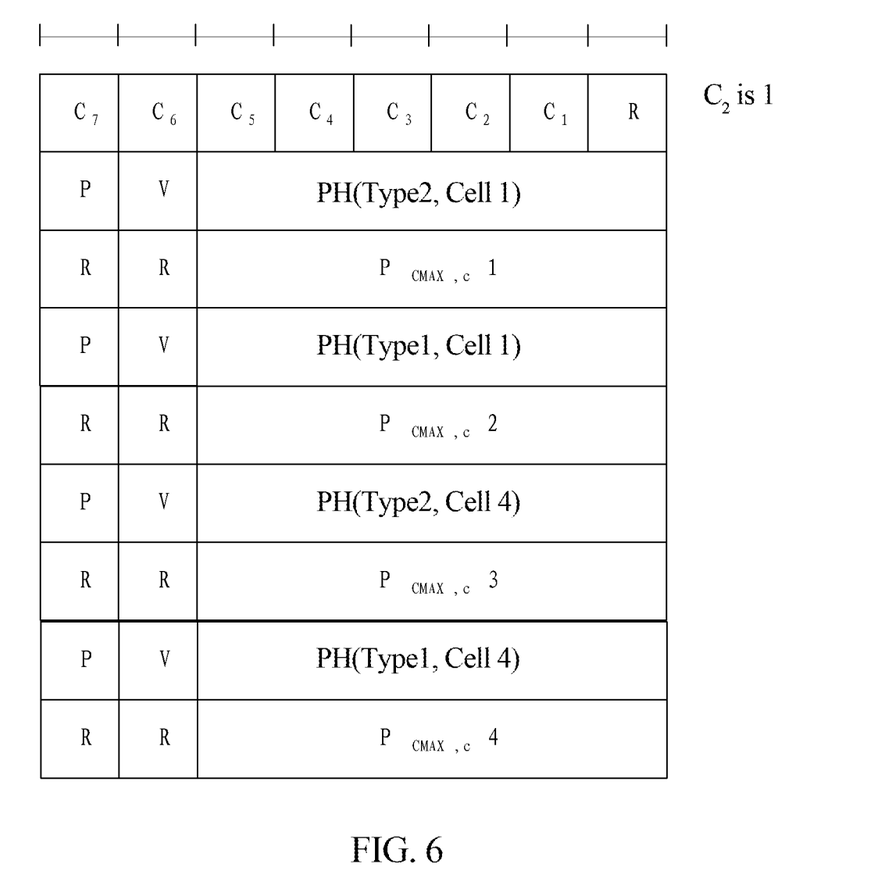
FIG. 6 is a schematic diagram of one reporting format of the PHR used in the embodiment 1 of the present document.

The reporting format is as shown in FIG. 6:
since the secondary serving cell identifier of the cell 4 is 2, C2 is '1';
next comes the cell 1 (Pcell), allowing PUCCH and PUSCH to be sent simultaneously, and thus the type2 PHR and a type1 PHR of the cell 1;
next comes the cell 4 (Scell), allowing PUCCH and PUSCH to be sent simultaneously, and thus the type2 PHR of the cell 4;
next come the type1 PHRs of all Scells, and there is only the type1 PHR of the cell 4;
sending is not required at other cells, thus the corresponding contents are all empty.

In step 504, due to the service traffic increment, the base station 1 adds a cell 3 for the terminal according to a measurement report, the cell 3 is an Scell, whose secondary serving cell identifier is configured as 1.

In step 505, the terminal receives configuration information of the cell 3, the cell 3 is not the first cell added by the base station 2, and the terminal does not trigger a PHR.

In step 506, the base station 2 notifies the terminal to activate the cell 3.

In step 507, the terminal triggers the PHR after activating the cell 3.

In step 508, since the PHRs of all cells need to be sent to the base stations including the base station 1 and/or the base station 2, the PHR is sent after receiving an uplink authorization of the cell 1 and the cell 4 or cell 3, the terminal discovers that the cell 4 is the secondary serving cell and is allowed to simultaneously send the PUCCH and the PUSCH, a new sending format requires to be used, and the PHR of the cell 3 also needs to be sent, and the contents of the used reporting format include:

a type2 PHR of the primary serving cell;
a type1 PHR of the primary serving cell;
type2 PHRs of the secondary serving cells that are configured with a PUCCH and may perform simultaneously the sending of the PUCCH and PUSCH;
the secondary serving cells in which sending is required include the type1 PHRs of the secondary serving cells that are configured with the PUCCH and may perform simultaneously the sending of the PUCCH and PUSCH;
the terminal reports the PHR to the MeNB and the SeNB, to which the terminal belongs, according to the reporting format.

Figure 7:
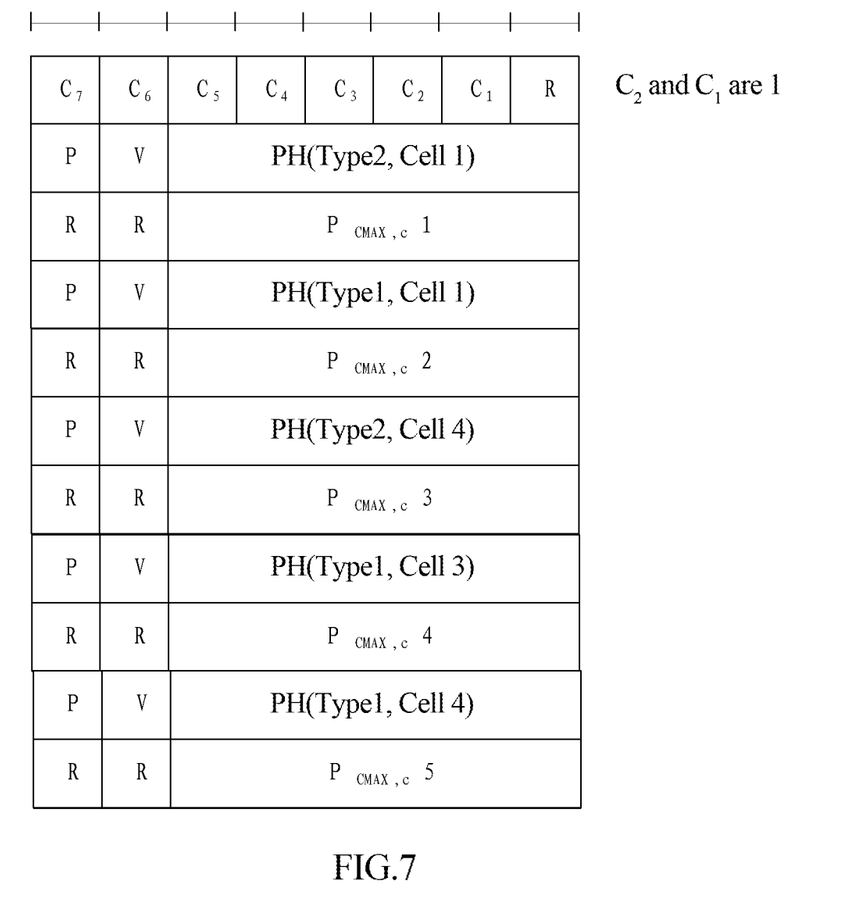
FIG. 7 is a schematic diagram of another reporting format of the PHR used in the embodiment 1 of the present document.

The reporting format is as shown in FIG. 7:
since the secondary serving cell identifier of the cell 3 is 1, C1 is '1'; and since the secondary serving cell identifier of the cell 4 is 2, C2 is '1';
next comes the cell 1 (Pcell), allowing PUCCH and PUSCH to be sent simultaneously, and thus the type2 PHR and the type1 PHR of the cell 1;
next comes the cell 4 (Scell), allowing PUCCH and PUSCH to be sent simultaneously, and thus the type2 PHR of the cell 4;
next come the type1 PHRs of all Scells, and here there are the type1 PHR of the cell 3 and the type1 PHR of the cell 4, according to a sequence of the secondary serving cell identifiers from small to large, first comes the type1 PHR of the cell 3, and then comes the type1 PHR of the cell 4.

Sending is not required at other cells, thus the corresponding contents are all empty.

The embodiment 2 of the present document will be described in combination with the accompanying drawings below.

The embodiment of the present document provides a method for reporting a power headroom report. In the embodiment of the present document, the terminal establishes a connection with the cell 1, the cell 1 is a Pcell, and a PUCCH is configured at the cell 1, and the cell 1 is allowed to simultaneously send the PUCCH and the PUSCH.

Figure 8:
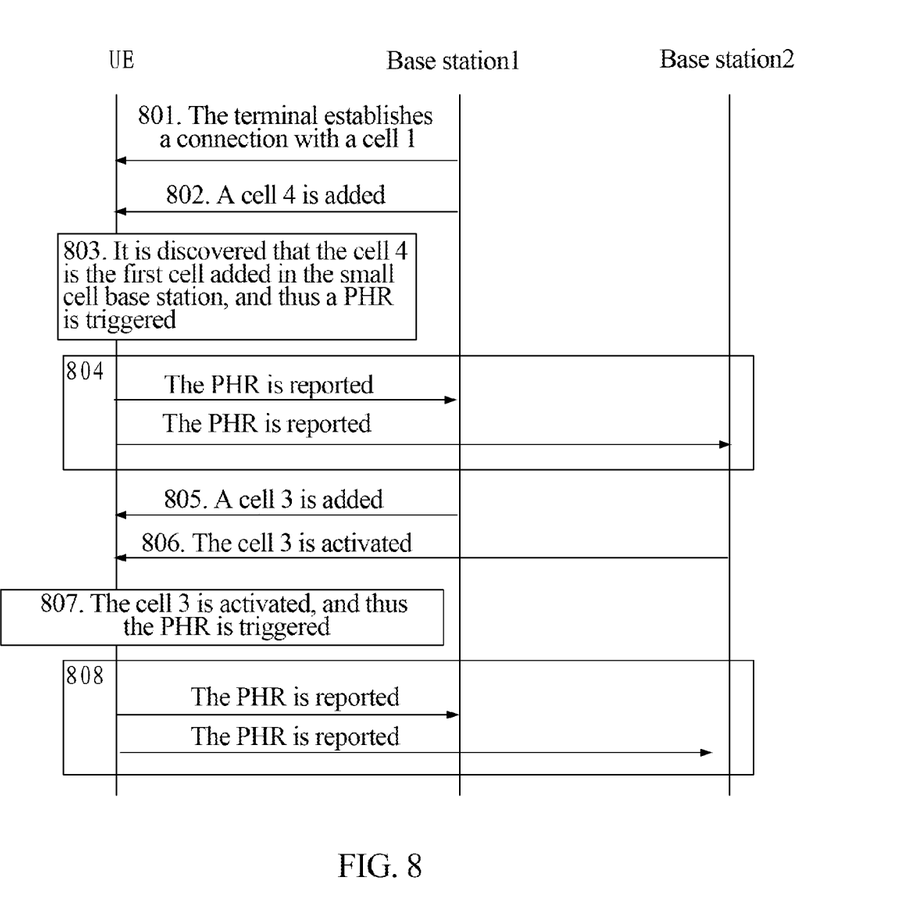
FIG. 8 is a flow chart of a method for reporting a power headroom report provided in the embodiment 2 of the present document.

The procedure for reporting the PHR of the dual-connectivity terminal is completed with the method for reporting the power headroom report provided in the embodiment of the present document, as shown in FIG. 8, and the following steps are included:

In step 801, due to the service traffic increment, the base station 1 adds a cell 4 for the terminal according to a measurement report, the cell 4 is an Scell, whose secondary serving cell identifier is configured as 2, and a PUCCH is configured at the cell 4, and the cell 4 is allowed to simultaneously send the PUCCH and the PUSCH.

In step 802, the terminal receives configuration information of the cell 4, discovers that the cell 4 is the first cell added in the SeNB, and thus triggers a PHR.

In step 803, since the PHRs of all cells need to be sent to the base stations including the base station 1 and/or the base station 2, the PHR is sent after receiving an uplink authorization of the cell 1 and cell 4, the terminal discovers that the cell 4 is the secondary serving cell and is allowed to simultaneously send the PUCCH and the PUSCH, a new reporting format requires to be used, and the following contents are included:

a type2 PHR of the primary serving cell;
a type1 PHR of the primary serving cell;
a type2 PHR and a type1 PHR of the secondary serving cell, arranged according to a sequence of the secondary serving cell identifiers when there are a plurality of secondary serving cells:
the type2 PHR of the secondary serving cell 1, wherein only the secondary serving cells that are configured with a PUCCH and may perform simultaneously the sending of the PUCCH and PUSCH have the type2 PHR, if the secondary serving cell 1 is not configured with the PUCCH and may not perform simultaneously the sending of the PUCCH and PUSCH, the item does not exist;
the type1 PHR of the secondary serving cell 1,
the type2 PHR of the secondary serving cell 2,
the type1 PHR of the secondary serving cell 2.

The terminal reports the PHR to the cell and the small cell, to which the terminal belongs, according to the reporting format.

Figure 9:
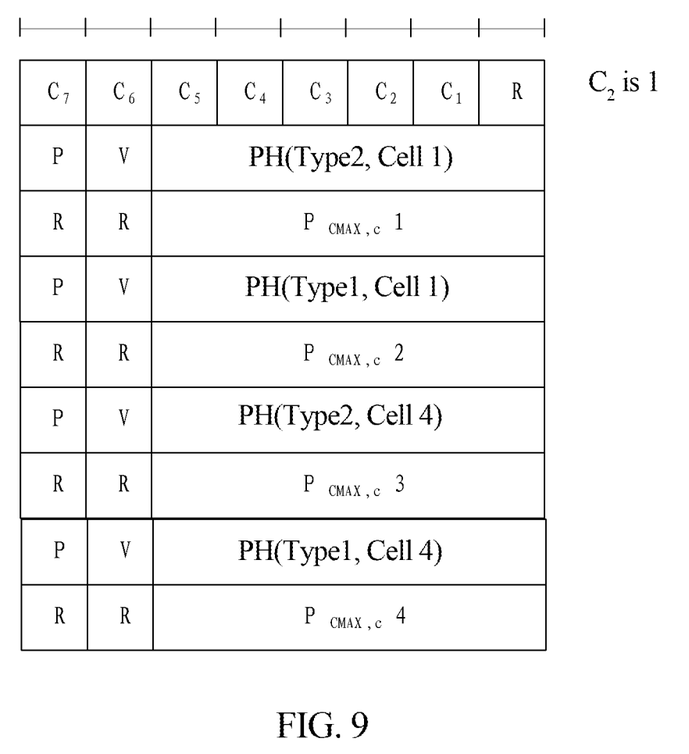
FIG. 9 is a schematic diagram of one reporting format of the PHR used in the embodiment 2 of the present document.

The reporting format is as shown in FIG. 9:
since the secondary serving cell identifier of the cell 4 is 2, C2 is '1';
next comes the cell 1 (Pcell), allowing PUCCH and PUSCH to be sent simultaneously, and thus the type2 PHR and the type1 PHR of the cell 1;
next come the type2 PHR and the type1 PHR of the Scell, there is only the cell 4 at this point, which allows the PUCCH and the PUSCH to be sent simultaneously, and thus the type2 PHR and the type1 PHR of the cell 4;
sending is not required at other cells, thus the corresponding contents are all empty.

In step 804, due to the service traffic increment, the base station 1 adds a cell 3 for the terminal according to a measurement report, the cell 3 is an Scell, whose secondary serving cell identifier is configured as 1.

In step 805, the terminal receives configuration information of the cell 3, the cell 3 is not the first cell added by the base station 2, and the terminal does not trigger a PHR.

In step 806, the base station 2 notifies the terminal to activate the cell 3.

In step 807, the terminal triggers the PHR after activating the cell 3.

In step 808, since the PHRs of all cells need to be sent to the base stations including the base station 1 and/or the base station 2, the PHR is sent after receiving an uplink authorization of the cell 1 and the cell 4 or cell 3, the terminal discovers that the cell 4 is the secondary serving cell and is allowed to simultaneously send the PUCCH and the PUSCH, a new reporting format requires to be used, and the reporting format includes the following contents:

a type2 PHR of the primary serving cell;
a type1 PHR of the primary serving cell;
a type2 PHR of the secondary serving cell 1, wherein only the secondary serving cells that are configured with a PUCCH and may perform simultaneously the sending of the PUCCH and PUSCH have the type2 PHR, if the secondary serving cell 1 is not configured with the PUCCH and may not perform simultaneously the sending of the PUCCH and PUSCH, the item does not exist;
a type1 PHR of the secondary serving cell 1,
a type2 PHR of the secondary serving cell 2,
a type1 PHR of the secondary serving cell 2;
arranged according to a sequence of the secondary serving cell identifiers,
the terminal reports the PHR to the cell and the small cell, to which the terminal belongs, according to the reporting format.

Figure 10:
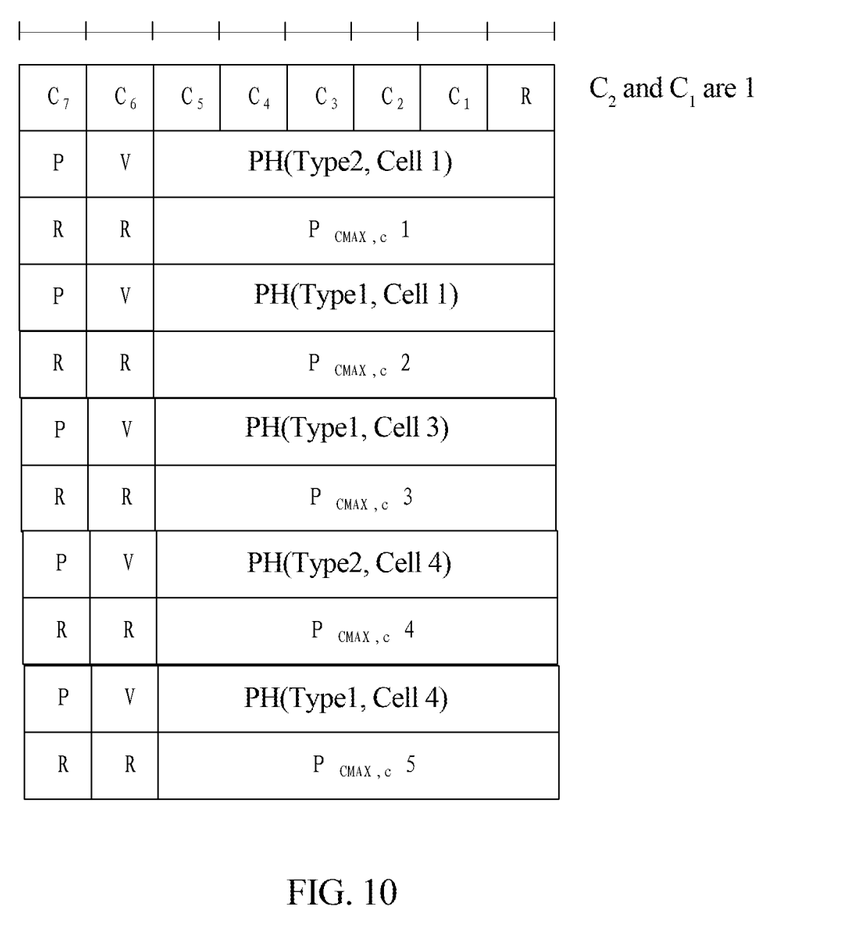
FIG. 10 is a schematic diagram of another reporting format of the PHR used in the embodiment 2 of the present document.

The reporting format is as shown in FIG. 10:
since the secondary serving cell identifier of the cell 3 is 1, C1 is '1', and since the secondary serving cell identifier of the cell 4 is 2, C2 is '1';
next comes the cell 1 (Pcell), allowing PUCCH and PUSCH to be sent simultaneously, and thus the type2 PHR and the type1 PHR of the cell 1;
next come the type2 PHR and the type1 PHR of the Scell, there are the cell 3 and the cell 4 at this point, the cell 3 does not allow PUCCH and PUSCH to be sent simultaneously, thus the cell 3 only has the type1 PHR, and the cell 4 allows PUCCH and PUSCH to be sent simultaneously, thus the cell 4 has the type2 PHR and the type1 PHR;
Sending is not required at other cells, thus the corresponding contents are all empty.

The embodiment 3 of the present document will be described in combination with the accompanying drawings below.

Figure 11:
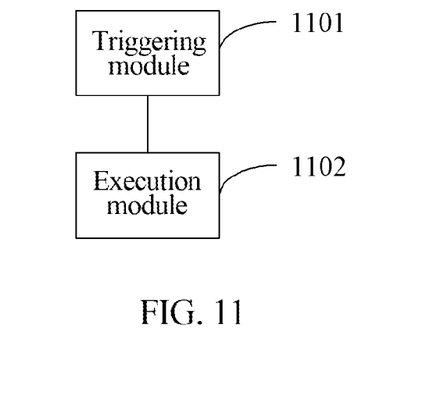
FIG. 11 is a schematic diagram of a structure of a device for reporting a power headroom report provided in the embodiment 3 of the present document.

The embodiment of the present document provides a device for reporting a power headroom report, and the structure of the device is as shown in FIG. 11, which includes:

a triggering module 1101, configured to trigger to report a PHR when detecting that the first cell is added in a SeNB; and an execution module 1102, configured to report the PHR to a MeNB and/or the SeNB, to which the execution module belongs.

Figure 12:
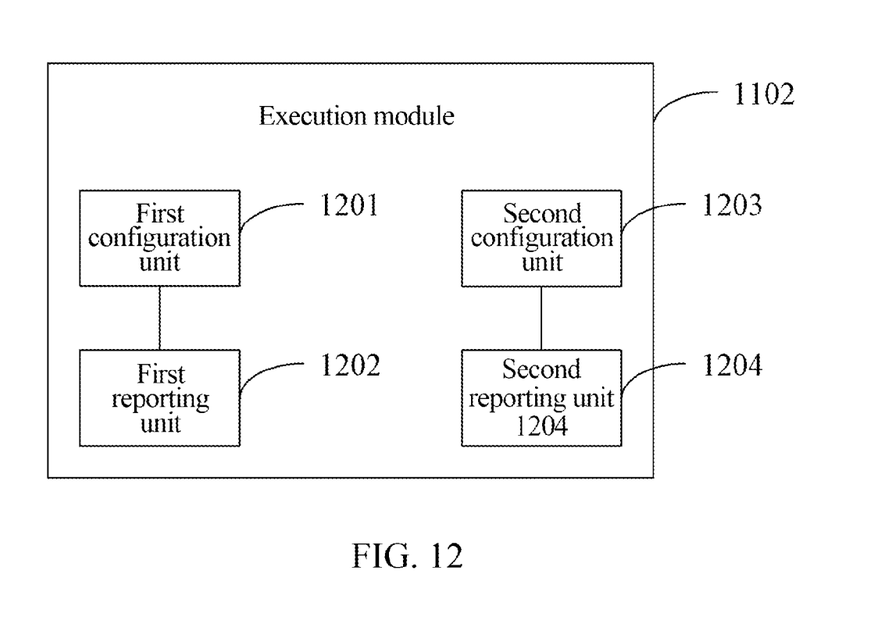
FIG. 12 is a schematic diagram of a structure of an execution module 1102 in FIG. 11.

Preferably, the structure of the execution module 1102 is as shown in FIG. 12, which includes:

a first configuration unit 1201, configured to arrange a reporting format of a PHR required to be reported according to the following sequence:
a type2 PHR of a primary serving cell;
a type1 PHR of the primary serving cell;
a type2 PHR of a secondary serving cell;
a type1 PHR of the secondary serving cell;
a first reporting unit 1202, configured to report the PHR to a cell and/or a small cell, to which the first reporting unit belongs, according to the reporting format.

Preferably, the secondary serving cells include the secondary serving cells that are configured with the PUCCH and may perform simultaneously the sending of the PUCCH and PUSCH;

preferably, the execution module 1102 also includes:
a second configuration unit 1203, configured to arrange a reporting format of a PHR required to be reported according to the following sequence:
a type2 PHR of a primary serving cell;
a type1 PHR of the primary serving cell;
a type2 PHR and a type1 PHR of a secondary serving cell, wherein only the secondary serving cells that are configured with the PUCCH and may perform simultaneously the sending of the PUCCH and PUSCH have the type2 PHR;

a second reporting unit 1204, configured to report the PHR to a cell and/or a small cell, to which the second reporting unit belongs, according to the reporting format.

The device for reporting the power headroom report as shown in FIG. 11 and FIG. 12 can be integrated in the terminal, and the terminal completes the corresponding functions.

The embodiments of the present document provide a method and device for reporting a power headroom report, a terminal triggers a PHR when detecting that the first cell is added in a SeNB, configures and reports the PHR to a MeNB and/or the SeNB, to which the terminal belongs. The PHR reporting of the dual-connectivity terminal is implemented, which solves the problem of lacking the triggering and sending mechanism for the PHR of the dual-connectivity terminal in the related art.

The ordinary person skilled in the art can understand that all or part of steps of the above embodiments can be implemented by using a flow of computer program, and the computer program can be stored in a computer readable memory medium, and the computer program is executed on corresponding hardware platforms (such as a system, equipment, device and component and so on), and when the program is carried out, one of the steps or a combination of the steps of the method embodiments is comprised.

Alternatively, all or part of the steps of the above embodiments also can be implemented by using integrated circuits, these steps can be made into a plurality of integrated circuit modules respectively or a plurality of modules or steps of them can be made into a single integrated circuit module to be implemented. Therefore, the embodiment of the present document is not limited to any combination of hardware and software in a specific form.

The devices or function modules or function units in the above embodiments can be implemented through a universal computing device, and they can be concentrated in a single computing device or distributed in a network consisting of a plurality of computing devices.

If implemented in a form of software function module and sold or used as an independent product, the devices or function modules or function units in the above embodiments can be stored in a computer readable memory medium. The computer readable memory medium mentioned above can be a read-only memory, magnetic disk or optical disk and so on.

Any skilled people familiar to the art can easily conceive changes or substitutions within the technical scope disclosed by the embodiments of the present document, and these changes and substitutions shall all be covered within the protection scope of the embodiments of the present document. Therefore, the protection scope of the embodiments of the present document should be subject to the protection scope described in the claims.

INDUSTRIAL APPLICABILITY

The embodiments of the present document provide a method and device for reporting the power headroom, a terminal triggers a PHR when detecting that the first cell is added in a SeNB, configures and reports the PHR to a MeNB and/or the SeNB, to which the terminal belongs. The PHR reporting of the dual-connectivity terminal is implemented, which solves the problem of lacking the triggering and sending mechanism for the PHR of the dual-connectivity terminal in the related art.

What is claimed is:

1. A method for reporting a power headroom report, comprising:

a terminal triggering to report a power headroom report, PHR, when detecting that a first cell is added in a small cell eNodeB, SeNB; and the terminal reporting the PHR to a MeNB and/or SeNB, to which the terminal belongs;

wherein, the terminal reporting the PHR to a MeNB and/or the SeNB, to which the terminal belongs, comprises:

the terminal configuring a reporting format of a PHR required to be reported according to the following sequence:

a type2 PHR of a primary serving cell;
a type1 PHR of the primary serving cell;
a type2 PHR of a secondary serving cell;
a type1 PHR of the secondary serving cell;

the terminal reporting the PHR to the MeNB and/or the SeNB, to which the terminal belongs, according to the reporting format;

wherein, when there are a plurality of secondary serving cells for which sending is required, in the reporting format, the type1 PHRs of the plurality of secondary serving cells are arranged according to a sequence of cell identifiers from small to large.

2. The method for reporting a power headroom report according to claim 1, wherein, when there are a plurality of secondary serving cells that are configured with PUCCH and can perform simultaneously sending of PUCCH and PUSCH, in the reporting format, the type2 PHRs of the plurality of secondary serving cells are arranged according to a sequence of cell identifiers from small to large.

3. The method for reporting a power headroom report according to claim 2, wherein, the secondary serving cells comprise the secondary serving cells that are configured with PUCCH and can perform simultaneously sending of PUCCH and PUSCH.

4. The method for reporting a power headroom report according to claim 3, wherein, when there are a plurality of secondary serving cells, in the reporting format, the type2 PHRs and the type1 PHRs of the plurality of secondary serving cells are arranged according to a sequence of cell identifiers from small to large.

5. The method for reporting a power headroom report according to claim 1, wherein, the terminal configuring and reporting the PHR to the MeNB and/or the SeNB, to which the terminal belongs, comprises:

the terminal configuring a reporting format of a PHR required to be reported according to the following sequence:

a type2 PHR of a primary serving cell;
a type1 PHR of the primary serving cell;
a type2 PHR and a type1 PHR of a secondary serving cell, wherein only a secondary serving cell that is configured with PUCCH and can perform simultaneously sending of PUCCH and PUSCH has the type2 PHR;

the terminal reporting the PHR to a cell and/or a small cell, to which the terminal belongs, according to the reporting format.

6. A device for reporting a power headroom report, comprising:

a triggering module, configured to trigger to report a PHR when detecting that a first cell is added in a small cell eNodeB, SeNB; and an execution module, configured to report the PHR to a MeNB and/or the SeNB, to which the device belongs;

wherein, the execution module comprises:
a first configuration unit, configured to configure a reporting format of the PHR required to be reported according to the following sequence:
a type2 PHR of a primary serving cell;
a type1 PHR of the primary serving cell;
a type2 PHR of a secondary serving cell;
a type1 PHR of the secondary serving cell;
a first reporting unit, configured to report the PHR to a cell and/or a small cell, to which the device belongs, according to the reporting format;
wherein, when there are a plurality of secondary serving cells for which sending is required, in the reporting format, the type1 PHRs of the plurality of secondary serving cells are arranged according to a sequence of cell identifiers from small to large.

7. The device for reporting a power headroom report according to claim 6, wherein, the execution module further comprises:
a second configuration unit, configured to configure a reporting format of the PHR required to be reported according to the following sequence:
a type2 PHR of a primary serving cell;
a type1 PHR of the primary serving cell;
a type2 PHR and a type1 PHR of a secondary serving cell, wherein only a secondary serving cell that is configured with PUCCH and can perform simultaneously sending of PUCCH and PUSCH has the type2 PHR;
a second reporting unit, configured to report the PHR to a cell and/or a small cell, to which the device belongs, according to the reporting format.

* * * * *